United States Patent [19]

Cheung

[11] Patent Number: 4,663,072

[45] Date of Patent: May 5, 1987

[54] ACID ANHYDRIDE MIXTURES IN PASTE FORM USEFUL FOR CURING EPOXY RESINS AND A DUAL CATALYST SYSTEM THEREFOR

[75] Inventor: Mo-Fung Cheung, Farmington Hills, Mich.

[73] Assignee: Ford Motor Company, Dearborn, Mich.

[21] Appl. No.: 685,376

[22] Filed: Dec. 24, 1984

[51] Int. Cl.$^4$ .................. C08G 59/42; C08G 59/72
[52] U.S. Cl. ................................ 252/182; 528/91; 528/115; 528/365
[58] Field of Search ............... 252/182; 525/507; 528/115, 365, 91

[56] References Cited

U.S. PATENT DOCUMENTS

| | | |
|---|---|---|
| 3,078,235 | 2/1963 | Bowman et al. . |
| 3,245,916 | 4/1966 | Weskow . |
| 3,247,125 | 4/1966 | Weskow . |
| 3,296,148 | 1/1967 | Talbert et al. . |
| 3,580,857 | 5/1971 | Cheng et al. . |
| 3,580,858 | 5/1971 | Evans et al. . |
| 4,045,408 | 8/1974 | Griffith et al. .................. 252/182 X |
| 4,273,914 | 6/1981 | Smith et al. ..................... 252/182 X |
| 4,349,645 | 9/1982 | Griggs ............................. 252/182 X |
| 4,490,511 | 12/1984 | Li et al. ............................ 252/182 X |

*Primary Examiner*—John F. Terapane
*Assistant Examiner*—Susan Wolffe
*Attorney, Agent, or Firm*—Lorraine S. Melotik; Roger L. May

[57] ABSTRACT

This invention relates to a stable acid anhydride paste mixture useful as a crosslinking agent for epoxy resins and a dual catalyst system therefor. In particular, the anhydride mixture comprises high melting point acid anhydride, a liquid acid anhydride, and a low melting point acid anhydride. The dual catalyst system comprises tertiary amine catalysts with boron trihalide amine complex catalysts.

22 Claims, No Drawings

ACID ANHYDRIDE MIXTURES IN PASTE FORM USEFUL FOR CURING EPOXY RESINS AND A DUAL CATALYST SYSTEM THEREFOR

TECHNICAL FIELD

This invention relates to an acid anhydride mixture useful as a crosslinking agent for epoxy resins. More particularly, the acid anhydride mixture of this invention comprises three specific acid anhydride components and is in a paste form that facilitates the ease of processing of the anhydrides with liquid epoxy resins. This invention also relates to the combined use of tertiary amine catalysts with boron trihalide amine complex catalysts to catalyze the curing reaction between epoxy resins and these anhydride mixtures.

BACKGROUND OF THE INVENTION

It is well known that polycarboxylic acid anhydrides are useful as curing agents for various epoxy resins. Such epoxy-anhydride compositions are useful, e.g., as coating compositions, adhesives, potting compounds and composites. However, since most polycarboxylic acid anhydrides are solid at room temperature, difficulties are encountered in trying to use these solid anhydrides as curing agents for liquid epoxy resins. One might attempt to incorporate the solid anhydride, in powdered form, into the epoxy resin. However, incorporation of a powder into a viscous liquid is very difficult and agglomeration usually occurs with air and moisture entrapment. The general procedure for blending a solid anhydride with a liquid epoxy resin is to heat the anhydride above its melting point and mix it with the resin at this temperature. However, operating at these high temperatures greatly shortens the "pot life" of the mixture so that it is difficult to mold or otherwise utilize large volumes of the epoxy-anhydride mixture before it sets to a hard, unarrangeable mass. Furthermore, the requirement of heating the curing agent and epoxy resin in order to be able to mix them together adds to the trouble and cost of the process.

There has been much investigation in recent years of methods of making room temperature liquid polycarboxylic acid anhydrides from solid anhydrides. It has generally been found that various anhydrides can be melted together to form low melting mixtures or eutectics which may be liquid at room temperature. For example, as taught in U.S. Pat. No. 3,296,148, a mixture of hexahydrophthalic anhydride, M.P. 36° C., and tetrahydrophthalic anhydride, M.P. 101° C., forms a low melting eutectic which is liquid above 23°–24° C. However, such liquids eventually solidify, or at least deposit solids, and consequently, one cannot be certain how long such mixtures will remain liquid, even when stored under anhydrous conditions. Various organic compounds, such as isocyanates, polyether polyols, and those containing an oxirane group, have been proposed as additives to stabilize these liquid anhydride blends. However, inclusion of these various stabilizing materials into the liquid anhydrides may require the use of elevated temperatures, e.g., 80° C. or higher, to prepare the stabilized mixture, require additional excessive costly amounts of stabilizer, and/or adversely affect the properties of the anhydride mixture and the epoxy resin cured therewith.

High melting point anhydrides, such as those having melting points greater than 150° C., however, are not particularly suitable for forming low melting eutectics. These high melting point anhydrides are used whenever epoxy-anhydride products having high glass transition temperatures, i.e., greater than about 150° C., are required. In order to incorporate these high melting point anhydrides into the epoxy resin, they are first heated to their melting point and then incorporated in the epoxy resin. However, as discussed previously, such processing limits the "pot life" of the mixture.

We have now found that a specific combination of anhydrides forms a uniform paste which can be easily dispersed into liquid epoxy resins at room temperature to form a liquid composition that cures uniformly.

BRIEF DESCRIPTION OF THE INVENTION

This invention is directed to an acid anhydride mixture useful as a crosslinking agent for epoxy resins. The mixture of anhydrides is in paste form. However, while the mixture is a paste, it can vary in its viscosity, i.e., it can vary from a viscous paste to one that is of low viscosity or high liquidity. The acid anhydride mixture of this invention comprises:

(A) solid acid anhydride having (a) functional groups capable of reacting as at least 3 carboxyl groups, and (b) a melting point of at least 150° C., wherein the solid acid anhydride is incorporated into the mixture as a particulate having a particle size, on average, of about between 3 and 15 microns;

(B) acid anhydride being liquid at room temperature; and (C) low melting acid anhydride having a melting point of between about 30° and 110° C.

The acid anhydride mixture comprises between about 40 and 80 mole percent of (A), between about 15 and 40 mole percent of (B), and between about 5 and 40 mole percent of (C). Preferably, the low melting anhydride has a melting point of between about 30° C. and 65° C. When making the paste mixture, a certain mixing sequence is preferably followed, wherein the liquid anhydride is incorporated into the high melting point anhydride and thereafter is added the low melting acid anhydride.

This invention is also directed to compositions comprising epoxy resins and the anhydride mixture of this invention. This invention is still further directed to the use of a dual catalyst system comprising tertiary amine catalysts and boron trihalide amine complex catalysts to accelerate the curing of compositions comprising epoxy resins and the anhydride mixture of this invention.

Advantageously, this specific combination of anhydrides forms a uniform paste mixture which can be dispersed very rapidly and easily into liquid epoxies. In contrast to the eutectic liquid anhydride mixtures of prior art compositions, no heating is required to form the paste anhydride mixture and no stabilizers are added to the mixture. However, like liquid anhydrides, it can be incorporated at room temperature into liquid epoxy materials, and forms a liquid dispersion.

Another advantage of the anhydride mixture of this invention is that it is suitable for forming epoxy-anhydride products having high glass transition temperatures, i.e., greater than about 150° C., as is necessary for attaining good interlaminar shear strength in, e.g., composite materials. As known in the art, the glass transition temperature of the product would also be dependent on the particular epoxy resin employed in combination with the anhydride.

The dual catalyst system described above, advantageously increases the rate of curing of an epoxy-anhydride composition, while maintaining the compositions desirable physical properties.

DETAILED DESCRIPTION OF THE INVENTION

This invention is directed to an acid anhydride mixture which is in paste form. The mixture is useful as a crosslinking agent for epoxy resins, particularly to achieve a cured epoxy composition having a glass transition temperature (Tg) greater than about 150° C. As disclosed previously in this application, the acid anhydride mixture of this invention comprises acid anhydrides selected from three different classes of acid anhydrides, i.e., high melting point acid anhydrides (A), acid anhydrides which are liquid at room temperature (B), and low melting acid anhydrides (C). The anhydride mixture comprises between about 40 and 80 mole percent of (A), between about 15 and 40 mole percent of (B), and between about 5 and 40 mole percent of (C). These anhydrides are hereafter discussed in greater detail.

One of the acid anhydride components of the acid anhydride paste mixture comprises a solid acid anhydride which has functional groups capable of reacting as at least three carboxyl groups, e.g., the anhydride may contain an anhydride group and a carboxyl group or contain two anhydride groups. As is known to those skilled in the art, an "anhydride group" is capable of reacting as two carboxyl groups. This anhydride also has a melting point of at least 150° C. Exemplary of such acid anhydrides, which may be used as this acid anhydride component of the paste mixture of this invention, are trimellitic anhydride, pyromellitic dianhydride, and 3,3',4,4'-Benzophenonetetracarboxylic dianhydride. Mixtures of various anhydrides falling within this category may also be used for the high melting point anhydride component of the invention mixture. When employed to form the paste mixture of this invention, this acid anhydride component is incorporated as a particulate having a particle size, on average, of between about 3 and about 15 microns, preferably between about 5 and about 10 microns.

The second type of acid anhydride component employed in the paste mixture comprises acid anhydrides which are liquid at room temperature, (i.e., liquid below about 25° C.). Anhydrides of this type include, but are not limited to, nadic methyl anhydride and methyl hexahydrophthalic anhydride. Mixtures of the liquid acid anhydrides may also be used as the liquid acid anhydride components in the paste mixture.

The third acid anhydride component of the paste mixture comprises acid anhydrides having a melting point between about 30° and 110° C., preferably between about 30° and 65° C. Exemplary of such low melting anhydrides are maleic anhydride, glutaric anhydride, cis-1,2-cyclohexane dicarboxylic anhydride, and 3,4,5,6 tetrahydrophthalic anhydride. As would be apparent to one skilled in the art, mixtures of the low melting anhydrides may also be employed.

The high melting point anhydride is included in the anhydride mixture in an amount of between about 40 and 80 mole percent of the mixture. By including this high melting anhydride in the anhydride mixture, it is possible to achieve a curved epoxy resin product having a high glass transition temperature and consequently, most desirable physical properties for such products, as adhesives, potting compounds and composites. The amount of liquid anhydride which is included in the anhydride mixture comprises between about 15 and 40 mole percent of the mixture, while the low melting anhydride is included in the anhydride mixture in an amount of about 5 and 40 mole percent. Preferably the molar ratios of the anhydride components (A): (B): (C) in the acid anhydride paste mixture is about 50-60: 20-25: 20-25. Generally, the major portion of the anhydride paste mixture component comprises the high melting point anhydride.

The most preferred way of achieving the paste form of the acid anhydride mixture is to add the liquid anhydride (B) to the fine powder high melting anhydride (A), mix thoroughly, and then add the low melting anhydride (C). While this method for forming the mixture is preferred, any mixing method may be employed which results in a paste mixture of the anhydrides. As is known in the art, anhydrides are moisture sensitive organic compounds. Thus, it is desirable in forming the paste mixture of this invention to exclude moisture, i.e., to maintain anhydrous conditions during materials transfer and materials processing.

As has been noted earlier in this application, this anhydride paste mixture is particularly useful in making high glass transition temperature epoxy products such as composites and electrical potting compounds. The anhydride mixture of this invention, when mixed into liquid epoxies, forms a liquid dispersion which easily wets fibers, such as glass or graphite, often employed in forming reinforced composite materials. The liquid nature of the epoxy-anhydride mixture also allows for the filling of gaps when this material is used as a potting compound. As is well known in the art, the interlaminar shear strength and glass transition temperature of the epoxy product are also affected by the particular epoxy resins employed. Therefore, generally, if one wishes to form cured epoxy resins having high glass transition temperatures one would employ epoxy resins which have at least two epoxide groups per molecule, generally more than two, and which have a low epoxide equivalent weight (i.e., epoxy resin weight per epoxide group). Many such epoxy resins are commercially available and known to those skilled in the art. Some of these preferred epoxy materials are solids. If one wishes to use these solid epoxy materials to form, e.g., high Tg composites, the solid epoxy resins can be dissolved in lower molecular weight liquid epoxy resins to form an epoxy mixture which is a liquid at normal processing temperatures, e.g., room temperature. While it is preferred, in order to achieve high Tg's in the epoxy composites, to use such high functionality, low equivalent weight liquid epoxy resins, this invention is not limited to their use. Any epoxy resin may be cured with the anhydride paste mixture of this invention. Generally, in forming epoxy-anhydride products, acceptable physical properties are obtained when the ratio of anhydride groups to epoxide groups is between about 0.4-0.7, preferably between about 0.5 and 0.6. Still further, while this application has discussed the use of the anhydride mixture of this invention to form, e.g., epoxy composite materials, potting compounds, adhesives, and coatings, the use of the anhydride mixture of this invention is not limited to forming such products, but may be used in any application made of anhydride curatives for epoxy resins.

Epoxy resins which may be cured with the anhydride mixture of this invention include, but are not limited to those having, on average, more than one, and preferably more than about two epoxide groups per molecule. Exemplary of such polyepoxide resins are those derived from a dihydric phenol or dihydric alcohol and an epihalohydrin. Examples of epihalohydrins are epichlorohydrin, epibromohydrin and epiiodohydrin with epichlorohydrin being preferred. Dihydric phenols and dihydric alcohols are exemplified by resorcinol, hydroquinone, Bisphenol A, p,p'-dihydroxy benzol phenone, p,p'-dihydroxy phenol, p,p'-dihydroxy diphenol ethane, bis-(2-hydroxy naphtha) methane, 1,5-dihydroxy naphthaline, ethylene glycol, propylene glycol, 1,4-butane diol, hydrogenated Bisphenol A, 1,4-cyclohexane diol, 1,3-cyclopentane diol, cyclohexane dimethanol, and the like. These polyepoxide resins are well known in the art and are made in the desired molecular weights by reacting the epihalohydrin and the diols in various ratios, or by reacting a dihydric phenol with a lower molecular weight polyepoxide resin. Other polyepoxide resins are the glycidyl polyethers of Bisphenol A. Examples of commercially available epoxy resins for use in this invention to form, e.g., composites, include Epon 826 and 828, available from and a trademark of Shell Chemical Company (Houston, Tex.). Mixtures of the epoxy resins may also be employed as the epoxy resin component with the acid anhydride mixture of this invention. While it is preferred to use room temperature liquid epoxy resins with the anhydride paste, solid epoxy resins may likewise be employed. As mentioned above, the solid epoxy may be dissolved in low molecular weight liquid epoxy resins to form a liquid epoxy mixture, or such solid epoxy resins may be heated to a liquid before use. However, such melt processing shortens the "pot life" of the composition, as has been described, and thus use of melted solid epoxy resins is less than desirable.

Catalysts are generally added to accelerate the curing of epoxy-anhydride compositions, otherwise, the rate of curing, even in elevated temperatures is generally very slow. Exemplary of such catalysts employed in epoxy-anhydride compositions are tertiary amine catalysts and boron trihalide amine complex catalysts, which are are well known in the art. I have found that the combined use of these two types of accelerators gives fast curing for epoxy resins cured with the anhydride paste mixture of this invention. Additionally, it has been found that use of this dual catalyst system, while giving a fast cure, maintains the desirable physical properties associated with high Tg materials, such as interlaminar shear strength. For example, by incorporating both of these amine catalysts into an epoxy-anhydride composition suitable for composites, the curing time of the epoxy material at 170° C. can be reduced from 16 hours to 1½ hours, while maintaining the interlaminar shear strength of the product.

Exemplary of the tertiary amine catalysts which may be employed in this invention include, but are not limited to tribenzylamine, N,N-Dimethylbenzylamine, and N-Benzyl-N-methylethanolamine. Exemplary of the boron trihalide amine complexes useful in the dual catalysts system of this invention include, but are not limited to, boron trichloride amine complexes, e.g., XU213; available from Ciba-Geigy, Ardsley, N.Y. and boron trifluoride amine complexes, e.g., Ancaflex 150, Anchor 1115 and Anchor 1222, available from Pacific Anchor Chemical Corp. One or more than one of each of these catalysts may be employed in the dual catalyst system. The amounts of the catalysts optionally employed to accelerate the cure of the epoxy-anhydride composition will be based on the useful "pot life" desired of the composition. This "pot life" would be dependent, e.g., on the particular composition, its use, and the processing parameters (e.g., time and temperature) used to form the products. For example, in composite or potting compound compositions, generally the tertiary amine catalyst is employed in the composition in an amount of about 1–3 weight percent, and the boron trihalide amine complex catalyst is employed in the composition in an amount of about 0.5–1.5 weight percent, wherein the weight of each catalyst employed is individually based on the weight of the epoxy resin present in the epoxy resin anhydride composition. Selection of the optimal amount of each catalyst to be employed to accelerate the curing of the epoxy-resin-anhydride mixture would be within the skill of those in the art.

The tertiary amine and boron trihalide amine complex can be incorporated into the epoxy resin (i.e., prior to its combination with the anhydride mixture). This epoxy-catalyst mixture remains stable with no apparent viscosity change, for a long period of time, e.g., greater than about three months at room temperature. While the dual catalyst system is preferably employed incorporated into the epoxy resin as described above, it may be added to the anhydride or to the epoxy-anhydride mixture. Since the boron trihalide catalysts are waxy materials not conveniently dispersed in the epoxy or anhydride, incorporation of the catalysts may be facilitated by dissolving the catalysts in a solvent, such as styrene, which is then mixed into, e.g., the epoxy resin. Styrene, or other such organic unsaturated materials, are also useful in the resin composition in certain applications to lower the viscosity and help release air entrapment. During curing, the styrene can be self-copolymerized, and/or copolymerized with unsaturated anhydrides, such as maleic anhydride, which may be employed in the anhydride mixture used to cure the resin. Alternately, the catalysts may be added to the epoxy resin which has been heated to facilitate incorporation of the catalysts. Incorporation of these catalysts is not limited to the procedures described above, and selection of the preferred way of incorporating the catalysts would be within the skill of those in the art.

The melting point of the epoxy-anhydride mixture is lower than the melting point of the high melting anhydride. Thus, when using an anhydride mixture employing, e.g., trimellitic anhydride which has a melting point of 165°–169° C. with the cure accelerator combination mentioned above, a clear casting of epoxy resin can be achieved at a temperature much lower than that of 170° C. For example, if a mixture of trimellitic anhydride/methyl hexahydrophthalic anhydride/maleic anhydride is used with these accelerators, a clear casting of epoxy resin can be achieved at a temperature as low as 120° C.

The invention will be further understood by referring to the following detailed examples. It should be understood that the specific examples are presented by way of illustration and not by way of limitation. Unless otherwise specified, all references to "parts" is intended to means parts by weight.

EXAMPLE 1

To a conventional sigma blade type mixing equipment is added 58.3 (50 mole percent) parts by weight of microfine trimellitic anhydride and 26.9 (25 mole percent) parts by weight of methyl nadic anhydride. Slow mix to a homogeneous mixture. The mixture at this point is still powdery. To the powdery mixture is added 14.8 (25 mole percent) parts by weight of powdered maleic anhydride and mixing is continued. With increasing mixing speed gradually the mixture turns into a homogeneous paste form.

EXAMPLE 2

The procedure of Example 1 is followed with the following change of composition.

|  | Parts by Weight (Mole %) |
| --- | --- |
| Trimellitic anhydride | 67.6 (60) |
| Methyl nadic anhydride | 20.9 (20) |
| Maleic anhydride | 11.5 (20) |

The same result as in Example 2 is obtained but with slightly higher viscosity.

EXAMPLE 3

The procedures of Example 1 is followed with the following change of composition.

|  | Parts by Weight (Mole %) | |
| --- | --- | --- |
|  | A | B |
| Trimellitic anhydride | 59.2 (50) | 68.4 (60) |
| Methylhexahydrophthalic anhydride | 25.8 (25) | 20.0 (20) |
| Maleic anhydride | 15.0 (25) | 11.6 (20) |

The same result as in Example 1 is obtained with good paste form consistency.

EXAMPLE 4

The procedures of Example 1 is followed with the following change in composition.

|  | Parts by Weight (Mole %) | | | |
| --- | --- | --- | --- | --- |
|  | A | B | C | D |
| Trimellitic anhydride | 56.8 (48) | 53.6 (50) | 54.5 (50) | 54.9 (50) |
| Methyl nadic anhydride | 26.4 (24) | 24.9 (25) | — | — |
| Methyl hexahydrophthalic anhydride | — | — | 23.9 (25) | 24.0 (25) |
| Glutaric anhydride | 16.8 (28) | — | — | — |
| Cyclohexyl anhydride | — | 21.5 (25) | — | — |
| Tetrahydrophthalic anhydride | — | — | 21.6 (25) | — |
| Phthalic anhydride | — | — | — | 21.1 (25) |
| Results | Paste | Paste | Paste | Dry powder |

The following examples demonstrate the use of these anhydride mixtures as curing agents for epoxy resins. Excellent physical properties are obtained.

EXAMPLE 5

|  | Parts by Weight |
| --- | --- |
| Epon 828[1] | 135 |
| Styrene | 15 |
| Anhydride mixture from Example 2 | 75 |

[1]Epon 828 is an epoxy resin manufactured by Shell Chemical Co.

The above ingredients mix to a fluid light yellow liquid. Unidirectional glass fibers are used and wetted by the epoxy-anhydride mixture at the ambient temperature. Air entrapment is removed by vacuum. The impregnated glass fibers are then placed in a positive displacement stainless steel mold and compression molded at 170° C. (press temperature) and under 200 psig pressure for one hour. The mold is then disassembled and specimens are cut and subjected to 24 hours of post curing at 170° C. These specimen samples are then tested by means of a short beam interlaminar shear strength test (ASTM D-2344-76) and give a static interlaminar shear strength of 94 Mpa (~13600 psi). The styrene incorporates into the system, lowering the viscosity of the resin mixture as well as helping to release air entrapment.

EXAMPLE 6

The procedures of Example 5 is repeated with the exception that styrene is replaced by high purity divinyl benzene. Similar results are obtained.

The following examples illustrate the use of a dual catalyst system comprising tertiary amine catalyst and boron trihalide amine complex catalyst for accelerating the curing of epoxy/anhydride compositions. In these examples, a dual catalyst system of tribenzylamine and boron-trichloride amine complex XU-213, a product of Ciba-Geigy Corp., are used. Ten grams of mixed resin formulation described in the examples are placed in individual aluminum dishes and covered. After curing for 30 minutes at 170° C., the glass transition temperatures are compared. The Tg data is obtained by a Differential Scanning Calorimetry method.

EXAMPLE 7

|  | Parts by Weight |
| --- | --- |
| Epon 828[1] | 90 |
| Styrene | 10 |
| Anhydride mixture from Example 3A | 60 |
| Tg = 119° C. | |

[1]Epon 828 is an epoxy resin manufactured by Shell Chemical Co.

EXAMPLE 8

|  | Parts by Weight |
| --- | --- |
| Epon 828[1] | 90 |
| Styrene | 10 |
| Tribenzyl amine | 1.5 |
| Anhydride mixture from Example 3A | 60 |
| Tg = 145° C. | |

[1]Epon 828 is an epoxy resin manufactured by Shell Chemical Co.

EXAMPLE 9

|  | Parts by Weight |
| --- | --- |
| Epon 828[1] | 90 |
| Styrene | 10 |
| Tribenzyl amine | 1.5 |
| XU213[2] | 0.5 |
| Anhydride mixture from Example 3A | 60 |

-continued

| | Parts by Weight |
|---|---|
| Tg = 160° C. | |

(1)Epon 828 is an epoxy resin manufactured by Shell Chemical Co.
(2)XU213 Boron trichloride amine complex available from Ciba-Geigy, Ardsley, N.Y.

Unidirectional glass fiber composites using the above anhydride mixtures as well as the catalyst system of this invention exhibit excellent static interlaminar shear strength. The following examples demonstrate these results.

EXAMPLE 10

| Composite Formulation | Parts by Weight |
|---|---|
| Epoxy Composition: | |
| DER 332(1) | 90 |
| Styrene | 10 |
| Tribenzyl amine | 2 |
| XU213(2) | 1 |
| Anhydride mixture from Example 3B | 52.2 |
| Tg = 160° C. | |

(1)DER332 is an epoxy resin available from Dow Chemical Co., Midland, MI.
(2)XU213 Boron trichloride amine complex available from Ciba-Geigy, Ardsley, N.Y.

Composites are prepared by the method described in Example 5. The composites are molded for 1.5 hours and specimens are cut and tested without need for further treatment or post cure. This composite is found to have 58% of glass fibers by volume and exhibits a static interlaminar shear strength of 89 MPa.

EXAMPLE 11

The procedures and compositions of Example 10 are repeated with the only exception that epoxy resin DER 332 is replaced by Epon 828. A static interlaminar shear strength of 96 MPa is obtained. (The fiber content is found to be 58% by volume).

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

I claim:

1. An acid anhydride mixture, useful as a crosslinking agent for epoxy resins, said mixture being in paste form and comprising:
   (A) solid acid anhydride having (a) functional groups capable of reacting as at least 3 carboxyl groups, (b) a melting point of at least 150° C., wherein said solid acid anhydride is incorporated in said mixture as a particulate having, on average, a particle size of between about 3 and about 15 microns;
   (B) acid anhydride being liquid at room temperature; and
   (C) low melting point acid anhydride having a melting point between about 30° and 110° C., wherein said acid anhydride mixture comprises between about 40 and 80 mole percent of (A), between about 15 and 40 mole percent of (B), and between about 5 and 40 mole percent of (C).

2. An acid anhydride mixture according to claim 1, wherein said particle size of said solid anhydride incorporated into said mixture is, on average, between about 5 and 10 microns.

3. An acid anhydride mixture according to claim 1, wherein said low melting point acid anhydride has a melting point of between about 30° and 65° C.

4. An acid anhydride mixture according to claim 1, wherein said mixture comprises between about 60 and 50 mole percent of (A), between about 25 and 20 mole percent of (B), and between about 25 and 20 mole percent of (C).

5. An acid anhydride mixture according to claim 1, wherein said solid acid anhydride (A) is selected from trimellitic anhydride and pyromellitic dianhydride.

6. An acid anhydride mixture according to claim 1, wherein said acid anhydride (B) is selected from nadic methyl anhydride and methyl hexahydrophthalic anhydride.

7. An acid anhydride mixture according to claim 1, wherein said low melting point acid anhydride (C) is selected from maleic anhydride and glutaric anhydride.

8. An acid anhydride mixture according to claim 1, wherein said mixture is made by incorporating said acid anhydride (B) into said acid anhydride (A) and subsequently incorporating therein said acid anhydride (C).

9. A composition comprising:
   I. epoxy resin;
   II. an acid anhydride mixture comprising:
   (A) solid acid anhydride having (a) functional groups capable of reacting as at least 3 carboxyl groups, (b) a melting point of at least 150° C., wherein said solid acid anhydride is incorporated in said mixture as a particulate having, on average, a particle size of between about 3 and about 15 microns;
   (B) acid anhydride being liquid at room temperature; and
   (C) low melting point acid anhydride having a melting point between about 30° C. and 110° C., wherein said acid anhydride mixture comprises between about 40 and 80 mole percent of (A), between about 15 and 40 mole percent of (B) and between about 5 and 40 mole percent of (C).

10. A composition according to claim 9, wherein said particle size of said solid acid anhydride (A) incorporated into said mixture is, on average, between about 5 and 10 microns.

11. A composition according to claim 9, wherein said low melting point acid anhydride (C) has a melting point of between about 30° and 65° C.

12. A composition according to claim 9, wherein said acid anhydride mixture comprises between about 60 and 50 mole percent of (A), between about 25 and 20 mole percent of (B), and between about 25 and 20 mole percent of (C).

13. A composition according to claim 9, wherein said solid acid anhydride (A) is selected from trimellitic anhydride and pyromellitic dianhydride.

14. A composition according to claim 9, wherein said acid anhydride (B) is selected from nadic methyl anhydride and methyl hexahydrophthalic anhydride.

15. A composition according to claim 9, wherein said low melting point acid anhydride (C) is selected from maleic anhydride and glutaric anhydride.

16. A composition according to claim 9, wherein said mixture is made by incorporating said acid anhydride (B) into said acid anhydride (A) and subsequently incorporating therein said acid anhydride (C).

17. A composition according to claim 9, which further comprises a dual catalyst system comprising:
(A) tertiary amine catalyst, and
(B) boron trihalide amine complex catalyst.

18. A composition according to claim 17, wherein said tertiary amine catalyst is selected from tribenzylamine, N,N-Dimethylbenzylamine and N-Benzyl-N-methylanolamine.

19. A composition according to claim 17, wherein said boron trihalide amine complex catalyst is selected from boron trichloride amine complexes and boron trifluoride amine complexes.

20. A composition according to claim 17, wherein said tertiary amine catalyst is employed in said composition in an amount of between about 1 and 3 weight percent, and said boron trihalide amine complex catalyst is employed in said compositiion in an amount of between about 0.1 and 1.5 weight percent, said weight percent of each of said catalysts being individually based on the weight of said epoxy resin present in said composition.

21. A composition according to claim 17, wherein said tertiary amine catalyst and said boron trihalide amine complex catalyst are incorporated into said epoxy resin prior to combination with said anhydride mixture to form said composition.

22. A composition comprising:
I. epoxy resin;
II. an acid anhydride mixture comprising:
  (A) solid acid anhydride having (a) functional groups capable of reacting as at least 3 carboxyl groups, (b) a melting point of at least 150° C., wherein said solid acid anhydride is incorporated in said mixture as a particulate having, on average, a particle size of between about 5 and about 10 microns;
  (B) acid anhydride being liquid at room temperature; and
  (C) low melting point acid anhydride having a melting point between about 30° C. and 65° C., wherein said acid anhydride mixture comprises between about 50 and 60 mole percent of (A), between about 25 and 20 mole percent of (B) and between about 25 and 20 mole percent of (C): and
III a dual catalyst system comprising:
  (A) tertiary amine catalyst, and
  (B) boron trihalide amine complex catalyst.

* * * * *